(12) United States Patent
Hirata et al.

(10) Patent No.: US 10,260,857 B2
(45) Date of Patent: Apr. 16, 2019

(54) LIGHT RECEIVING DEVICE AND POSITION DETECTION DEVICE

(71) Applicant: KODENSHI CORPORATION, Uji-shi (JP)

(72) Inventors: Mai Hirata, Uji (JP); Hiroyuki Fukui, Uji (JP); Hideo Fukuda, Uji (JP)

(73) Assignee: Kodenshi Corporation, Uji-shi (JP)

( * ) Notice: Subject to any disclaimer, the term of this patent is extended or adjusted under 35 U.S.C. 154(b) by 0 days.

(21) Appl. No.: 15/763,761

(22) PCT Filed: Sep. 28, 2016

(86) PCT No.: PCT/JP2016/004372
§ 371 (c)(1),
(2) Date: Mar. 27, 2018

(87) PCT Pub. No.: WO2017/061085
PCT Pub. Date: Apr. 13, 2017

(65) Prior Publication Data
US 2018/0274901 A1    Sep. 27, 2018

(30) Foreign Application Priority Data
Oct. 6, 2015  (JP) .................................. 2015-198760

(51) Int. Cl.
*G01B 11/02*  (2006.01)
*G01B 11/00*  (2006.01)

(52) U.S. Cl.
CPC ............ *G01B 11/02* (2013.01); *G01B 11/002* (2013.01)

(58) Field of Classification Search
CPC ............................. G01B 11/02; G01B 11/002
USPC .................................................. 356/614–640
See application file for complete search history.

(56) References Cited

FOREIGN PATENT DOCUMENTS

| JP | 2002-33600 | 1/2002 |
|----|------------|--------|
| JP | 2013-13947 | 1/2013 |

*Primary Examiner* — Tri T Ton
(74) *Attorney, Agent, or Firm* — Fay Kaplun & Marcin, LLP (57) ABSTRACT

A light receiving device includes a light receiving element and an operation unit. The light receiving element receives light that is partly blocked by an object to be measured, on first and second light receiving regions to output respective first and second output currents. The output unit outputs the first and second output current or a value based thereon to the outside. When the direction parallel to a light receiving surface of the light receiving element and perpendicular to the first direction is defined as a second direction, a length of the second light receiving region in the second direction is, entirely in the first direction, longer than the length of the first light receiving region in the second direction.

18 Claims, 5 Drawing Sheets

Fig.5 (i2) CALCULATION RESULT 
SLIT POSITION

LIGHT RECEIVING DEVICE AND POSITION DETECTION DEVICE

TECHNICAL FIELD

The present invention mainly relates to a light receiving device that detects a position of an object to be measured by using a light receiving element.

BACKGROUND ART

A position detection device including a light source, a light receiving element, and an operation unit has been conventionally known. The position detection device detects a position of an object to be measured that moves between the light source and the light receiving element along a predetermined direction (for example, a position of an end of the object to be measured, a slit position, etc.)

The light source such as a light emitting diode or the like, can irradiate light. The light receiving element such as a photodiode or the like, has a light receiving surface. The light receiving element converts the light that is irradiated on the light receiving surface to a current and the like, and thereby can detect the light. The operation unit detects a position of the object to be measured based on the current and the like that is output from the light receiving element.

Specifically, in such configuration, the amount of which the light irradiated from the light source is blocked by the object to be measured can be detected based on the amount of light that is detected by the light receiving element. Accordingly, the position of the object to be measured can be detected. Patent Document 1 (Japanese Patent Application Laid-Open No. 1998-209489) and Patent Document 2 (Japanese Patent Application Laid-Open No. 1989-36088) disclose this type of position detection device.

Patent Document 1 discloses a light receiving element with a configuration in which a light receiving surface is divided into two regions. Specifically, each light receiving region is a right triangle, and its hypotenuses are opposed to each other. In Patent Document 1, the position of an object to be measured is detected by individually detecting light that is irradiated on two light receiving regions and calculating (one output value)/(total output value of two regions).

In Patent Document 2, as with Patent Document 1, two triangular-shaped light receiving regions are arranged with its hypotenuses opposing to each other. In detail, the light receiving regions of Patent Document 2 have a trapezoid shape approximating to a triangle.

SUMMARY OF THE INVENTION

When both of two light receiving regions have triangular shape as with Patent Document 1, it is conceivable that, at both ends in a moving direction of an object to be measured, the light is detected only in the vicinity of a vertex of the triangle (only in a pointed portion). In this case, since the current and the like that is output by a light receiving element has a small value, an influence of error is large and a position of the object to be measured cannot be accurately detected. In detail, the light receiving region of Patent Document 2 has a trapezoid shape approximating to a triangle. Therefore, the influence of error is smaller than Patent Document 1, even so, the error may still affect a position accuracy of the object to be measured.

When the position of the object to be measured is detected based on the light that is detected on two light receiving regions, a difference of current and the like (a value in which one light receiving amount is subtracted from the other light receiving amount) may be used, other than the formula used in Patent Document 1. However, in Patent Documents 1 and 2, the difference of current and the like may be negative depending on the position of the object to be measured. In a circuit included in an operation unit, values less than 0 may be output as 0. Therefore, in Patent Documents 1 and 2, it is difficult to use the formula including the difference of current and the like.

The present invention relates to a position detection device capable of accurately detecting a position of an object to be measured and properly calculating a difference of current and the like in a case of calculating it.

According to an aspect of the present invention, in a light receiving device used for detecting a position of an object to be measured in a first direction, the following configuration is provided. That is, the light receiving device includes a light receiving element and an output unit. The light receiving element has a first light receiving region and a second light receiving region. The light receiving element receives light that is irradiated from a light source and partly blocked by the object to be measured, on the first light receiving region and the second light receiving region, and thereby outputs a first output current based on the light irradiated on the first light receiving region and a second output current based on the light irradiated on the second light receiving region. The output unit outputs the first output current and the second output current or a value based on the first output current and the second output current to the outside. When a direction parallel to a light receiving surface of the light receiving element and perpendicular to the first direction is defined as a second direction, a length of the second light receiving region in the second direction is, entirely in the first direction, longer than the length of the first light receiving region in the second direction.

Accordingly, since an end of the second light receiving region in the first direction has a longer length in the second direction, the current to be output and the like always has a value with a certain level or more even when the light is irradiated only to the end or its vicinity. Therefore, since an influence of error is small, the position of the object to be measured can be accurately detected. Then, (current to be output and the like on the second light receiving region)≥(current to be output and the like on the first light receiving region) is always fulfilled. Therefore, since the difference of the current and the like is always positive, the position of the object to be measured can be detected even when the formula including the difference of current and the like is used.

The light receiving device is preferably configured as follows. That is, a shape in which the length in the second direction increases as approaching one end in the first direction, is defined as a first surface shape. When a shape in which the length in the second direction increases at the same rate as the first surface shape as approaching the other end in the first direction, is defined as a second surface shape, the first light receiving region is the first surface shape. The second light receiving region is a shape combined the first surface shape and the second surface shape at least one by one.

Accordingly, for example, when each of the first surface shape and the second surface shape in the first direction has the same length, a configuration of (the value of current and the like when the light is irradiated to the entire second light receiving region)=(the value of current and the like when the light is irradiated to the entire first light receiving region)× integer, can be achieved by a size of the light receiving region, not by an amplification factor of current and the like. Therefore, a process of obtaining the position of the object to be measured can be simplified. Even when each length of the first surface shape and the second surface shape in the first direction is different from each other, the first surface shape and the second surface shape have same inclination (a change rate of the length in the second direction). Therefore, various light receiving surfaces can be achieved, for example, by combining the plurality of second surface shapes.

The light receiving device is preferably configured as follows. That is, the length of the first light receiving region in the first direction is same as that of the second light receiving region in the first direction. The first light receiving region is the first surface shape. The second light receiving region is a shape combined one first surface shape and one second surface shape.

Accordingly, since (first light receiving region)/(second light receiving region) corresponds to first surface shape/(first surface shape+second surface shape), the process of obtaining the position of the object to be measured can be simplified.

The light receiving device is preferably configured as follows. That is, the length of the first light receiving region in the first direction is same as that of the second light receiving region in the first direction. The first light receiving region is the first surface shape. The second light receiving region is a shape combined one first surface shape and two second surface shapes.

Accordingly, since (second light receiving region−first light receiving region)/(second light receiving region+first light receiving region) corresponds to the second surface shape (first surface shape+second surface shape), the process of finding the position of the object to be measured can be simplified.

In the light receiving device, when a shape obtained by enlarging or reducing a shape combined the first surface shape and the second surface shape, in the second direction with a magnification larger than zero, is defined as a composite surface shape, the first light receiving region is either one of the first surface shape, or a shape combined the first surface shape and the composite surface shape. The second light receiving region is preferably either one of the composite surface shape with a magnification different from the composite surface shape of the first light receiving region, or a shape combined the composite surface shape and the second surface shape.

In the light receiving device, the first light receiving region may be the first surface shape, and the second light receiving region may be the composite surface shape.

In the light receiving device, the first light receiving region may be a shape combined one first surface shape and one composite surface shape. The second light receiving region may be a shape combined one second surface shape and one composite surface shape.

Accordingly, a current value output from each light receiving region can be arbitrarily set.

Preferably, in the light receiving device, the first light receiving region and the second light receiving region have a shape from which at least one end in the first direction of at least one light receiving region is removed.

Accordingly, the value of current and the like to be output based on the second light receiving region always has a value with a certain level or more. Therefore, since the influence of error is small, the position of the object to be measured can be accurately detected.

Preferably, in the light receiving device, the first light receiving region and the second light receiving region have a shape in which a region having a predetermined shape is added to at least one end in the first direction of at least one light receiving region.

Accordingly, for example, even when the object to be measured is inclined, the current and the like to be output from the light receiving element can be stabilized.

This can achieve a position detection device including the light receiving device, the light source, and the output unit for outputting the position of the object to be measured in the first direction.

BRIEF DESCRIPTION OF THE DRAWINGS

FIGS. 1 (a) and 1 (b) show a perspective view and a plan view of a position detection device according to one embodiment of the present invention.

FIGS. 2 (a1), 2 (a2), 2 (b), 2 (c), and 2 (d) show variations of a shape of a light receiving region.

FIGS. 4 (a), 4 (b), 4 (c), 4 (d), and 4 (e) show illustrating a difference in a length of the light receiving region in a second direction depending on a position in a first direction, and an influence of error.

FIGS. 5 (a), 5 (b), 5 (c), 5 (d), 5 (e), 5 (f), 5 (g), 5 (h), 5 (i1), and 5 (i2) show an example of a shape obtained by cutting out a part of the light receiving region, a shape obtained by adding a predetermined shape to the light receiving region, and a shape having a plurality of second surface shapes.

DETAILED DESCRIPTION

Next, an embodiment of the present invention will be described with reference to drawings. Firstly, a summary of a position detection device will be described with reference to FIGS. 1 (a), 1 (b), 2 (a1), 2 (a2), 2 (b), 2 (c), and 2 (d).

Figure 1:
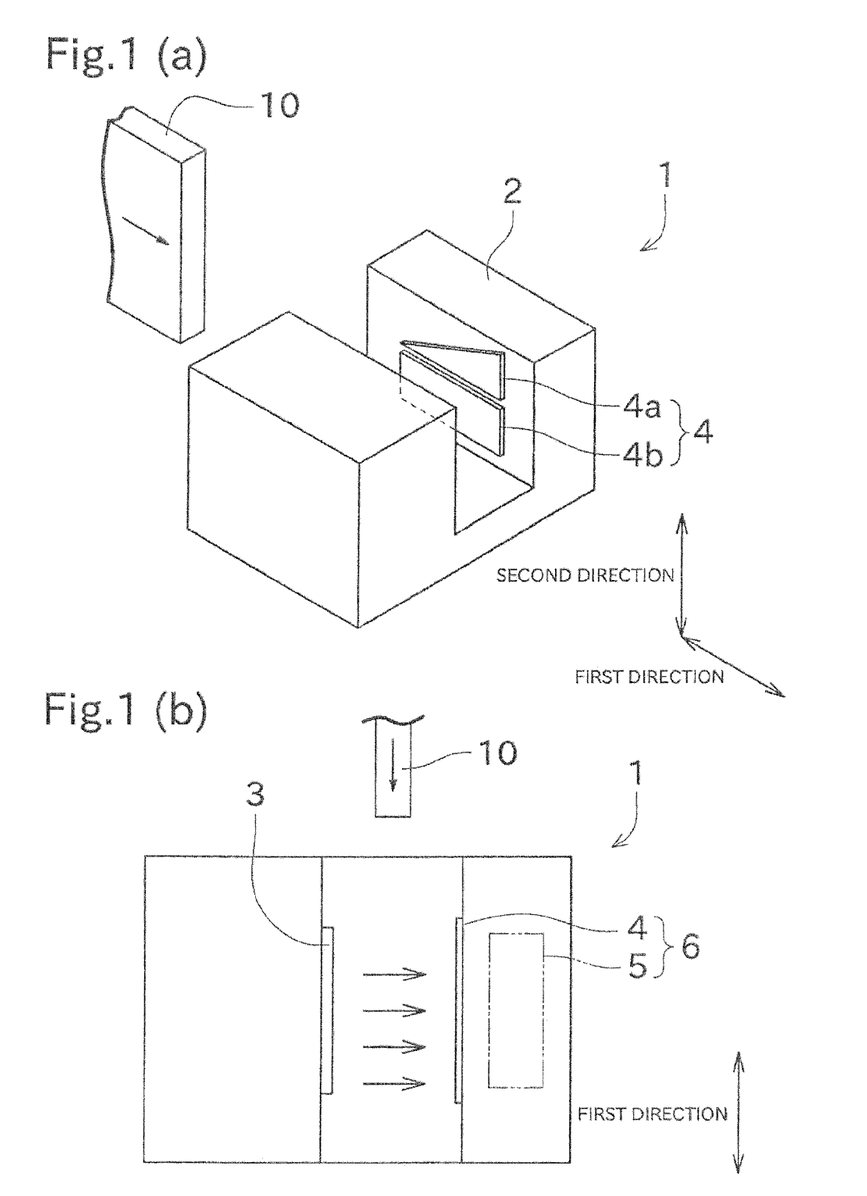

A position detection device 1, shown in FIGS. 1 (a) and 1 (b), is a device for detecting a first direction position of an object to be measured 10 that moves along a predetermined direction (first direction). The position of the object to be measured 10 means, for example, a position of an end of the object to be measured 10 or a position of a slit formed in the object to be measured 10. In the position detection device 1, various positions can be detected as long as the position is a boundary between a light blocking portion and an unblocking portion.

As shown in FIGS. 1 (a) and 1 (b), the position detection device 1 includes a casing 2, a light source 3, a light receiving element 4 and an operation unit (output unit) 5. In the position detection device 1, a portion including at least the light receiving element 4 and the operation unit 5 corresponds to a light receiving device 6.

The casing 2 having a rectangular parallelepiped notch is arranged so that the light source 3 and the light receiving element 4 are opposed to the notch. The operation unit 5 is arranged within the light receiving element 4. The object to be measured 10 is configured to pass through the notch. In this embodiment, although the light source 3 and the light receiving element 4 are arranged in one casing 2, the light source 3 and the light receiving element 4 may be arranged respectively in two casings opposing to each other.

The light source 3 is a light emitting diode or the like, and irradiates the light to the light receiving element 4. A configuration of the light source 3 is not limited to the light emitting diode, and may be a fluorescent lamp or the like. The light source 3 substantially uniformly irradiates the light throughout a light receiving surface of the light receiving element 4.

The light receiving element 4 is a photodiode or the like, and outputs current with a magnitude corresponding to the amount of light that is irradiated to the light receiving surface. In this embodiment, the light receiving surface is divided into two regions (a first light receiving region 4a and a second light receiving region 4b). The light receiving element 4 separately outputs the current based on the amount of light irradiated to the first light receiving region 4a (a first output current) and the current based on the amount of light irradiated to the second light receiving region 4b (a second output current). When the object to be measured 10 is positioned between the light source 3 and the light receiving element 4, a part of the light irradiated by the light source 3 is blocked by the object to be measured 10. Therefore, the first output current and the second output current of the light receiving element 4 are changed.

The operation unit 5 is configured by a predetermined circuit, and the first output current and the second output current are input from the light receiving element 4. The operation unit 5 detects a position of the object to be measured 10 in the first direction, based on the first output current and the second output current. The operation unit 5 outputs the position of the object to be measured 10 in the first direction (a value based on the first output current and the second output current) to an external device of the light receiving device 6.

Figure 2:
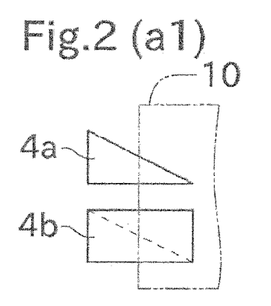

As described above, the position of the object to be measured 10 is, for example, a position of the end of the object to be measured 10 or a position of the slit formed in the object to be measured 10. FIG. 2 (*a*1) shows that a part of the light receiving surface is blocked by the object to be measured 10. FIG. 2 (*a*2) shows a situation that the light receiving surface is entirely blocked, except for a part of the light receiving surface (a part of which the slit of the object to be measured 10 is formed). Here, the length of the first light receiving region 4a in the second direction is changed (in detail, changed with a certain rate of change) as approaching one end in the first direction. Therefore, in both cases of FIG. 2 (*a*1) and FIG. 2 (*a*2), the first output current is changed as the object to be measured 10 is moved in the first direction. Accordingly, the operation unit 5 can detect a position of the object to be measured 10.

Next, variations of a shape of the light receiving surface of the light receiving element 4 will be described with reference to FIGS. 2 (*a*1), 2 (*a*2), 2 (*b*), 2 (*c*), and 2 (*d*). In an example shown in FIGS. 2 (*a*1), 2 (*a*2), 2 (*b*), 2 (*c*), and 2 (*d*), although the first light receiving region and the second light receiving region are relatively spaced from each other in the second direction due to visibility of the drawings, the distance therebetween in the second direction is generally closer (see FIGS. 1 (*a*) and 1 (*b*)).

In the example of FIG. 2 (*a*1) or FIG. 2 (*a*2) (hereinafter, correctively referred to as FIG. 2 (*a*)), the light receiving surface includes the first light receiving region 4a and the second light receiving region 4b. The first light receiving region 4a is a right triangle whose length in the second direction is longer as approaching one end (left) in the first direction (first surface shape). The second light receiving region 4b is a shape (rectangle) combined one first light receiving region 4a and one right triangle in which the first light receiving region 4a is turned by 180° (second surface shape). The second surface shape in FIG. 2 (*a*) can be represented as "a right triangle whose length in the second direction is longer with the same rate as the first light receiving region 4a as approaching the other end (right) in the first direction".

Here, in Patent Document 1, two right triangular shaped light receiving regions are arranged with its hypotenuses opposing to each other. In this case, since the sum of the first output current and the second output current is fixed, a position of the object to be measured can be detected by calculating (first output current)/(first output current+second output current). In Patent Document 1, since both an adder circuit and a dividing circuit are needed, a circuit configuration is complicated.

In contrast, in the example of FIG. 2 (*a*), the second light receiving region 4b corresponds to (first output current+second output current) of Patent Document 1. Therefore, in the example of FIG. 2 (*a*), a position of the object to be measured can be detected merely by calculating first output current)/(second output current). Accordingly, since it is unnecessary for the operation unit 5 to have the adder circuit, the circuit configuration is simplified. The simplified circuit configuration leads to a stable output to be obtained.

Next, the example of FIG. 2 (*b*) will be described. In the example of FIG. 2 (*b*), the light receiving surface includes a first light receiving region 4c and a second light receiving region 4d. The first light receiving region 4c is a right triangle whose length in the second direction is longer as approaching one end (right) in the first direction (the first surface shape in the example of FIG. 2 (*b*)). The second surface shape in the example of FIG. 2 (*b*) is a right triangle whose length in the second direction is longer with the same rate as the first light receiving region 4c as approaching the other end (left) in the first direction. The second light receiving region 4d is a shape combined one first surface shape (first light receiving region 4c) and two second surface shapes.

Figure 3:
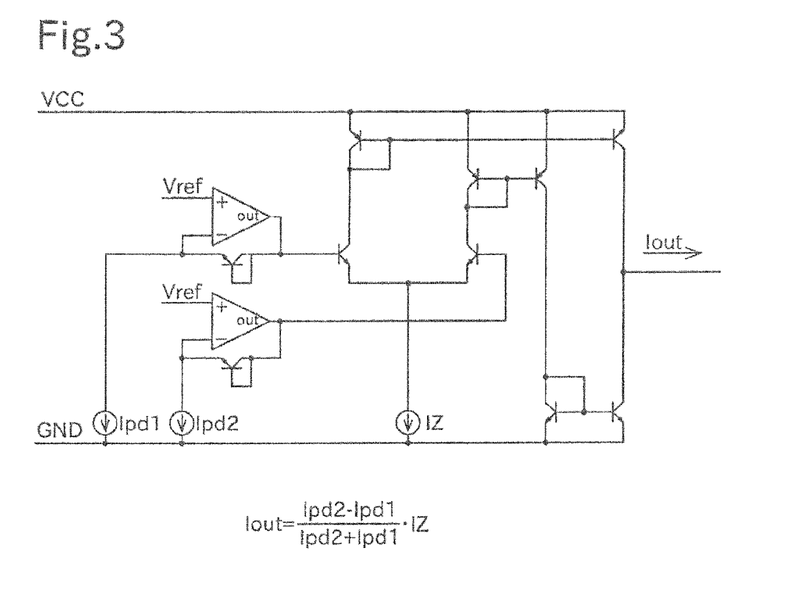
FIG. 3 shows one example of an arithmetic circuit used in an example of FIG. 2 (b).

The example of FIG. 2 (*b*) will be described from another viewpoint. The first light receiving region 4c is a shape in which the first light receiving region 4a is subtracted from the second light receiving region 4b. The second light receiving region 4d is a shape combined the second light receiving region 4b and the first light receiving region 4a. Therefore, in the example of FIG. 2 (*b*), (second output current−first output current)/(second output current+first output current) is calculated by an arithmetic circuit shown in FIG. 3, which can obtain (first output current)/(second output current) in the example of FIG. 2 (*a*). Accordingly, the circuit configuration can be simplified. In the arithmetic circuit shown in FIG. 3, when both the first output current and the second output current are 0, the output value is also 0. Therefore, "the function to fix the output value to a certain value" described in Patent Document 1 is unnecessary.

Next, the example of FIG. 2 will be described. In the example of FIG. 2 (*c*), the light receiving surface includes a first light receiving region 4e and a second light receiving region 4f. The first light receiving region 4e is a same shape as the first light receiving region 4a (first surface shape in the example of FIG. 2 (*c*)). The second light receiving region 4f is a shape in which the second light receiving region 4b (that is, a shape combined the first surface shape and the second surface shape in the example of FIG. 2 (*c*)) is enlarged or reduced in the second direction with magnification β larger than 0 (composite surface shape).

In the example of FIG. 2 (*c*), as with FIG. 2 (*a*), a position of the object to be measured can be detected merely by calculating (first output current) (second output current). In the example of FIG. 2 (*c*), the second output current is multiplied by β in comparison with FIG. 2 (*a*). Therefore, (first output current) (second output current) inclination (the amount of change in the first direction) can be set to an arbitrary value by using a shape of the light receiving surface, not by using the arithmetic circuit. For example, inclination of (first output current)/(second output current) increases, which can accurately detect a position of the object to be measured 10.

Next, the example of FIG. 2 (*d*) will be described. In the example of FIG. 2 (*d*), the light receiving surface includes a first light receiving region 4g and a second light receiving region 4h. In the example of FIG. 2 (*d*), a shape of the first light receiving region 4c is the first surface shape, and a shape of the first light receiving region 4a is the second surface shape. In the example of FIG. 2 (*d*), a shape in which the first surface shape and the second surface shape are combined and enlarged or reduced with magnification larger than 0 in the second direction, is the composite surface shape. The first light receiving region 4g is a shape combined one first surface shape and one composite surface shape (magnification γ1). The second light receiving region 4h is a shape combined one second surface shape and one composite surface shape (magnification γ2).

The first light receiving region 4g and the second light receiving region 4h will be described from another viewpoint. As shown in FIG. 2 (*d*), the first light receiving region 4g is a shape in which the first light receiving region 4e is subtracted from the second light receiving region 4f (magnification β=γ1), and the second light receiving region 4h is a shape combined the second light receiving region 4f (magnification β=γ2) and the first light receiving region 4e.

In the example of FIG. 2 (*d*), when the composite surface shape of the first light receiving region 4g and the second light receiving region 4h have the same magnification β, as with the example of FIG. 2 (*b*), (first output current)/(second output current) in the example of FIG. 2 (*a*) can be obtained by calculating (second output current−first output current)/(second output current+first output current). In the example of FIG. 2 (*d*), the second output current is multiplied by β, as compared with FIG. 2 (*b*). Therefore, (first output current)/(second output current) inclination (the amount of change in the first direction) can be set to an arbitrary value by using a shape of the light receiving surface, not by using the arithmetic circuit. For example, inclination of (first output current)/(second output current) increases, which can accurately detect a position of the object to be measured 10.

As such, in this embodiment, the length of the second light receiving region in the second direction is, entirely in the first direction, longer than the length of the first light receiving region in the second direction. Therefore, the calculation of (second output current−first output current) is always positive, which can detect a position of the object to be measured 10 by using the calculation (for example, FIG. 2 (*b*), FIG. 2 (*d*), etc.).

Next, a case where the light is irradiated only to the end of the light receiving region will be described with reference to FIGS. 4 (*a*), 4 (*b*), 4 (*c*), 4 (*d*), and 4 (*e*)

Figure 4:
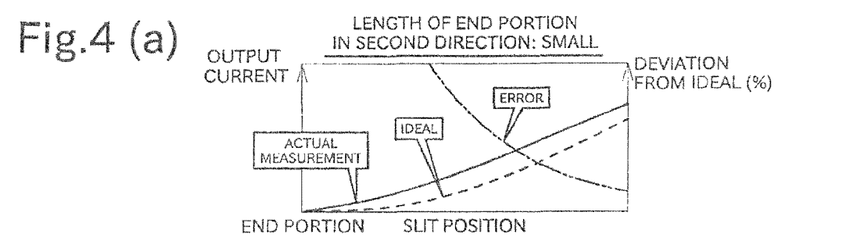

FIG. 4 (*a*) shows, in the light receiving region having a right triangle shape such as the light receiving region of Patent Document 1 or the first light receiving region 4a, the output current and the like when the light is irradiated only to a pointed end of the light receiving region. The horizontal axis shows a position where the slit exists. The horizontal axis has its left end as an end of the light receiving region, and shows the position that is away from the end as approaching the right. "Ideal" is the output current when there is no error. "Actual measurement" is an actual measured output current. As can be seen by referring to "error" comparing the actual measurement and the ideal, the error increases as the slit position approaches the end. In the following, the reason why such error occurs will be briefly described with reference to FIG. 4 (*b*) to (*d*).

FIG. 4 (*b*) is a graph showing how a dark current (leakage current) acts as the error. As shown in the graph, the dark current is substantially constant irrespective of the light irradiated to the light receiving region (that is, the slit position). Therefore, the influence of error s relatively larger as the output current decreases (that is, as the slit position approaches the end).

FIG. 4 (*c*) is a graph showing how a current caused by a side wall of the light receiving surface of the light receiving element acts as the error. As shown in the graph, the current based on the side wall is substantially constant irrespective of the light irradiated to the light receiving region (that is, the slit position), except when the slit position is substantially aligned with the end. Therefore, the influence of error is relatively larger as the output current decreases (that is, as the slit position approaches the end).

FIG. 4 (*d*) is a graph showing how the error of an end shape of the light receiving region (the error caused by a dimensional accuracy of the end shape) acts. Of course, this type of error has a greater influence as the length of the light receiving region in the second direction is reduced.

As described above, when the light receiving region is in the right triangle shape, the influence of error increases as the slit position approaches the end. This leads to a decline in a detection accuracy of the slit position of the object to be measured 10.

In this regard, the second light receiving region of this embodiment has the feature that "the length in the second direction is, entirely in the first direction, longer than the first light receiving region." Therefore, since both ends of the second light receiving region are not pointed, the influence of error described above is small. FIG. 4 (*e*) is data showing such feature of the second light receiving region. As shown in FIG. 4 (*e*), the influence of error can be suppressed even when the slit position is in the vicinity of the end. This can improve the detection accuracy of the slit position of the object to be measured 10.

Next, an example of a shape in which a part of the light receiving region is cut out will be described with reference to FIG. 5 (*a*) to (*d*).

Figure 5:
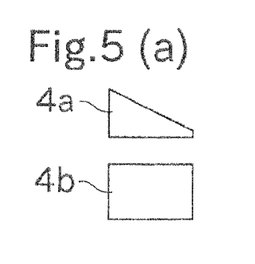

FIG. 5 (*a*) to (*d*) shows the shapes in which both ends of the first light receiving region and the second light receiving region in the first direction are cut out, with respect to the shapes of the above FIG. 2 (*a*) to (*d*). By adopting such shapes, there is no longer the pointed portion of the light receiving region. Therefore, as described in FIG. 4, the influence of error can be suppressed even when the slit position is the vicinity of the end. This can improve the detection accuracy of the slit position of the object to be measured 10. In FIG. 5 (*a*) to (*d*), although the first light receiving region and the second light receiving region has their both ends which are cut out, both ends of either one of the first light receiving region and the second light receiving region may be cut out (in this case, it is preferable to remove the end on the same side in the first light receiving region and the second light receiving region), or they may have a shape in which only one end is cut out, not both ends.

Next, FIG. 5 (*e*) to (*h*) are drawings showing the example of the shape in which a predetermined shape is added to the light receiving region.

The first light receiving region 4a of FIG. 5 (*e*) has, with respect to the shape of FIG. 2 (*a*), a shape in which one end in the first direction (unpointed end) is extended in the first direction without changing the length in the second direction. The second light receiving region 4b of FIG. 5 (e) has, with respect to the shape of FIG. 2 (a), a shape in which the other end different from the first light receiving region 4a is extended in the first direction without changing the length in the second direction. As such, the shapes of the first light receiving region and the second light receiving region are defined, which can stabilize the output current even when the object to be measured 10 is inclined. The same effect can be exerted also for FIG. 5 (f) to FIG. 5 (h).

The first light receiving region 4c of FIG. 5 (f) has, with respect to the shape of FIG. 2 (b), a shape in which one end in the first direction (unpointed end) is extended in the first direction. The second light receiving region 4d of FIG. 5 (f) has, with respect to the shape of FIG. 2 (b), a shape in which both ends are extended in the first direction. In FIG. 5 (f), inclination of the hypotenuses of the first light receiving region 4c and the second light receiving region 4d is maintained, and the ends are extended in the first direction without inclining them.

FIG. 5 (g) shows a shape, with respect to the shape of FIG. 2 (b), in which one end of the first light receiving region 4c in the first direction (unpointed end) and both ends of the light receiving region 4d are extended in the first direction. FIG. 5 (g) shows a shape in which the ends in the first direction of the first light receiving region 4c and the second light receiving region 4d are inclinedly extended. Specifically, in two light receiving regions, the size in the first direction increases as one light receiving region is away from the other light receiving region. FIG. 5 (h) shows a shape in which the light receiving region is extended without inclining like FIG. 5 (g) (while maintaining the length in the second direction).

Although a preferred embodiment of the present invention has been described above, the above-described configuration can be modified, for example, as follows.

The above-described shape of the light receiving region is merely illustrative, and other shapes may be adoptable. For example, although the first surface shape and the second surface shape have same length in the first direction in the examples of FIG. 2 (a) to (d), each length may be different from each other as shown in FIG. 5 (i1). Specifically, a first light receiving region 4i is the first surface shape, and a second light receiving region 4j is a shape combined the first surface shape and two second surface shapes. Two second surface shapes are arranged side by side in the first direction. In this example, a position of the object to be measured 10 is detected by using (first output current)/(second output current). Therefore, as shown in FIG. 5 (i2), in a portion including the second surface shape on the right side, inclination of the above-described calculation result is larger than the portion including the second surface shape on the right side. This can accurately detect the position of the object to be measured 10. In the above-described embodiment, although the first light receiving region and the second light receiving region are aligned up and down in the vertical direction, they may be aligned on the left and right. In this case, the first direction is the vertical direction. Furthermore, in the above-described embodiment, although the first surface shape and the second surface shape are the right triangle, they may not be the right triangle and may be curved instead of hypotenuse. The combination of the first surface shape, the second surface shape, and the composite surface shape is arbitrary as long as the position of the object to be measured 10 can be detected, and this is not limited to the above-described examples.

In the above-described embodiment, the first light receiving region is one region. However, for example, when the total output current of two physically separated regions is output, these two regions may be combined as the first light receiving region. The same applies to the second light receiving region.

The light source 3 is not limited to the light emitting diode, and ambient light such as solar light or lighting may be used. The object to be measured 10 may be arbitrary and may be a sheet shape or a disk shape. The operation unit 5 may perform calculation by converting the output current into voltage. Instead of the operation unit 5, an output unit for converting the first output current and the second output current as necessary and outputting it to an external device may be arranged.

DESCRIPTION OF THE REFERENCE NUMERALS 1 position detection device
2 casing
3 light source
4 light receiving element
4a,4c,4e,4g first light receiving region
4b,4d,4f,4h second light receiving region
5 operation unit (output unit)
10 object to be measured

The invention claimed is:

1. A light receiving device for detecting a position in a first direction of an object to be measured, comprising:
   a light receiving element having a first light receiving region and a second light receiving region, the light receiving element outputting a first output current and a second output current, the first output current based on receiving an irradiated light on the first light receiving region, the second output current based on receiving an irradiated light irradiated on the second light receiving region, the light being irradiated from a light source and partly blocked by the object; and
   an output unit outputting the first output current and the second output current or a respective value based thereon,
   wherein a direction parallel to a light receiving surface of the light receiving element and perpendicular to the first direction is defined as a second direction, and
   wherein a length of the second light receiving region in the second direction is longer than a length of the first light receiving region in the second direction from a first end while approaching a second end in the first direction.

2. The light receiving device according to claim 1,
   wherein a first surface shape includes the length in the second direction increasing from the first end to the second end in the first direction,
   wherein a second surface shape includes the length in the second direction increasing from the second end to the first end in the first direction,
   wherein a combined surface shape includes at least one of the first surface shape and at least one of the second surface shape,
   wherein a composite surface shape is the combined surface shape that is enlarged or reduced with a magnification greater than 0 in the second direction,
   wherein each of the first light receiving region and the second light receiving region is one of the first surface shape, the second surface shape, the combined surface shape, the composite surface shape, or a combination thereof.

3. The light receiving device according to claim 1, wherein a length of the first light receiving region in the first direction is same as a length of the second light receiving region in the first direction.

4. The light receiving device according to claim 2, wherein the combined surface shape includes one of the first surface shape and two of the second surface shape.

5. The light receiving device according to claim 2, wherein the first light receiving region is one of the first surface shape or a first combination of the first surface shape and the composite surface shape with a first magnification, and
wherein the second light receiving region is one of the composite surface shape with a second magnification different from the first magnification, or a second combination of the composite surface shape and the second surface shape.

6. The light receiving device according to claim 5, wherein the first light receiving region is the first surface shape, and
wherein the second light receiving region is the composite surface shape.

7. The light receiving device according to claim 5, wherein the first light receiving region is the first combination, the first combination including one of the first surface shape and one of the composite surface shape, and
wherein the second light receiving region is the second combination, the second combination including one of the second surface shape and one of the composite surface shape.

8. The light receiving device according to claim 2, wherein the first surface shape is a first triangular shape, wherein the second surface shape is a second triangular shape.

9. The light receiving device according to claim 8, wherein the first light receiving region includes the first triangular shape with a first predetermined shape added thereto on at least one of the first end and the second end of the first light receiving region in the first direction, and
wherein the second light receiving region includes one of the first triangular shape and two of the second triangular shape with a second predetermined shape added thereto on at least one of the first end and the second end of the second light receiving region in the first direction.

10. A position detection device, comprising:
a light source; and
a light receiving device detecting a position in a first direction of an object to be measured and includes:
 a light receiving element having a first light receiving region and a second light receiving region, the light receiving element outputting a first output current and a second output current, the first output current based on receiving an irradiated light on the first light receiving region, the second output current based on receiving an irradiated light irradiated on the second light receiving region, the light being irradiated from a light source and partly blocked by the object; and
 an output unit outputting the first output current and the second output current or a respective value based thereon, wherein a direction parallel to a light receiving surface of the light receiving element and perpendicular to the first direction is defined as a second direction, and
wherein a length of the second light receiving region in the second direction is longer than a length of the first light receiving region in the second direction from a first end while approaching a second end in the first direction, and
wherein the output unit outputs the position which is detected based on the first output current and the second output current.

11. The light receiving device according to claim 2, wherein the combined surface shape includes one of the first surface shape and one of the second surface shape.

12. The light receiving device according to claim 8, wherein the first light receiving region has a first trapezoidal shape in which a pointed end is removed from the first triangular shape, and
wherein the second light receiving region has a second trapezoidal shape including a plurality of the first trapezoidal shape.

13. The light receiving device according to claim 8, wherein the first triangular shape and the second triangular shape are right triangles.

14. The light receiving device according to claim 13, wherein the combined shape includes one of the first triangular shape and one of the second triangular shape arranged with hypotenuses opposed to one another.

15. The light receiving device according to claim 1, wherein the length of the second light receiving region in the second direction is longer than an increasing length with the same rate of the first light receiving region in the second direction from the first end while approaching the second end in the first direction.

16. The light receiving device according to claim 1, wherein the length of the second light receiving region in the second direction is longer than an increasing length with a dynamic rate of the first light receiving region in the second direction from a first end while approaching a second end in the first direction.

17. The light receiving device according to claim 1, wherein the length of the second light receiving region in the second direction is longer than an increasing length with a first rate followed by a second rate of the first light receiving region in the second direction from a first end while approaching a second end in the first direction.

18. A light receiving device for detecting a position in a first direction of an object to be measured, comprising:
a light receiving element having a first light receiving region and a second light receiving region, the light receiving element outputting a first output current and a second output current, the first output current based on receiving an irradiated light on the first light receiving region, the second output current based on receiving an irradiated light irradiated on the second light receiving region, the light being irradiated from a light source and partly blocked by the object; and
an output unit outputting the first output current and the second output current or a respective value based thereon,
wherein a direction parallel to a light receiving surface of the light receiving element and perpendicular to the first direction is defined as a second direction, and
wherein a length of the second light receiving region in the second direction is longer with the same rate than a length of the first light receiving region in the second direction from a first end while approaching a second end in the first direction.

\* \* \* \* \*